United States Patent
Groh et al.

(10) Patent No.: US 7,541,937 B2
(45) Date of Patent: Jun. 2, 2009

(54) BATTERY MODULE SWITCH

(75) Inventors: William S. Groh, Knoxville, TN (US); Albert L. Lee, IV, Seymour, TN (US); Steven M. Schrick, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 617 days.

(21) Appl. No.: 11/178,850

(22) Filed: Jul. 11, 2005

(65) Prior Publication Data

US 2005/0241926 A1 Nov. 3, 2005

Related U.S. Application Data

(63) Continuation-in-part of application No. 10/315,896, filed on Dec. 10, 2002, now Pat. No. 6,917,295.

(51) Int. Cl.
*G08B 23/00* (2006.01)
*G08B 21/00* (2006.01)

(52) U.S. Cl. ............... 340/573.3; 340/693.7; 340/636.1

(58) Field of Classification Search ............. 340/573.3, 340/636.1, 693.7; 119/859, 714, 715, 721; 362/203–205, 158; 429/185
See application file for complete search history.

(56) References Cited

U.S. PATENT DOCUMENTS

| 4,321,315 | A | * | 3/1982 | Jensen | 429/152 |
|---|---|---|---|---|---|
| 4,985,812 | A | * | 1/1991 | Uke | 362/158 |
| 5,021,305 | A | * | 6/1991 | Turner | 429/65 |
| 5,070,437 | A | * | 12/1991 | Roberts, Sr. | 362/158 |
| 5,349,506 | A | * | 9/1994 | Maglica | 362/158 |
| 5,596,314 | A | * | 1/1997 | Goldstein | 340/632 |
| 5,598,082 | A | | 1/1997 | Gilpin et al. | |
| 5,747,189 | A | | 5/1998 | Perkins | |
| 6,086,218 | A | * | 7/2000 | Robertson | 362/157 |
| 6,220,720 | B1 | * | 4/2001 | Stephens | 362/205 |
| 6,231,208 | B1 | * | 5/2001 | Dalton et al. | 362/186 |
| 6,371,055 | B1 | | 4/2002 | Lawrence | |
| 6,917,295 | B2 | | 7/2005 | Groh et al. | |
| 2002/0087154 | A1 | | 7/2002 | Shippert | |
| 2003/0116101 | A1 | | 6/2003 | Kim et al. | |
| 2004/0113795 | A1 | | 6/2004 | Groh et al. | |

* cited by examiner

*Primary Examiner*—Benjamin C Lee
*Assistant Examiner*—Jennifer Mehmood
(74) *Attorney, Agent, or Firm*—Pitts & Brittian, P.C.

(57) ABSTRACT

A battery module cooperating with an electronic animal control device for activating and deactivating the electronic animal control device. The battery module switch is a user-replaceable power source providing a rotary switching function while maintaining a hermetic seal.

21 Claims, 9 Drawing Sheets

BATTERY MODULE SWITCH

CROSS-REFERENCE TO RELATED APPLICATIONS

This is a continuation-in-part application of application Ser. No. 10/315,896, filed Dec. 10, 2002.

STATEMENT REGARDING FEDERALLY SPONSORED RESEARCH OR DEVELOPMENT

Not Applicable.

BACKGROUND OF THE INVENTION

1. Field of Invention

The invention relates to electronic animal control devices. More specifically, this invention relates to a battery module that allows an operator to switch the electronic animal control device between powered-on and powered-off states while maintaining a hermetic seal.

2. Description of the Related Art

Electronic animal control devices are generally collar-mounted devices designed for use in a variety of situations and environments. Pet owners contain their pets using electronic containment fences, owners and trainers correct bad habits and encourage good habits using electronic animal training devices, and electronic bark control devices deter nuisance barking. Because many animals spend at least a portion of their time outside, the electronic animal control devices must be designed to withstand common environmental conditions, such as rain. Further, the activities of some animals, such as swimming, require the electronic animal control device to be completely watertight to withstand immersion. In addition to water, it is desirable that the electronic animal control device exclude other foreign particulates such as dirt. In order to exclude foreign particulates, every access point must be secured against intrusion. Common access points include power switches and panels for accessing user replaceable batteries.

Each separate component takes up valuable space within the collar-mounted unit and adds weight. Size and weight are of concern when designing a collar-mounted device. A device that is large and heavy cannot be used with smaller animals. Accordingly, it is desirable to combine elements when possible.

BRIEF SUMMARY OF THE INVENTION

A battery module cooperating with an electronic animal control device for activating and deactivating the electronic animal control device, or battery module switch, is shown and described. The battery module switch is a user-replaceable power source providing a rotary switching function while maintaining a hermetic seal.

An electronic animal control device includes a representative housing containing the electronics associated with the desired control features. The housing is attached to a collar, which is worn by the animal. A battery module is inserted into and secured within a battery module opening defined by the housing. Because of the integration of a switch and the battery module, no other breach of the housing is necessary to add user accessible controls.

The battery module includes a barrel, a retainer ring, and a cover. The barrel is tubular member that is closed on one end and sized to receive a battery within the interior. The barrel is fabricated from a material that is not electrically conductive. The barrel is closed on opposing end by the retainer ring, which secures the battery within the battery module. The retainer ring defines a first terminal opening allowing access to a first terminal of the battery. The barrel defines a second terminal opening allowing access to a second terminal of the battery. The sides of the barrel around the second terminal opening are sloped to provide a transition between the recessed surface of the battery and the outer surface of the barrel. Additionally, at least one tab extends outwardly from the barrel. The tabs provide a key for guiding the insertion of the battery module into the housing and for securing the battery module within the housing.

The closed-end of the barrel includes the cover. The cover has a radial lip extending beyond the circumference of the barrel, i.e., the cover has an outside diameter greater than the outside diameter of the barrel. Proximate to the radial lip, the barrel includes a shoulder. A sealing gasket is disposed around the outside edge of the shoulder and against the bottom surface of the radial lip.

Together the battery module, a circuit board, and the housing contain components that cooperate to complete the battery module switch. The circuit board includes two electrical contacts adapted to make contact with the exposed terminals of the battery when the battery module is inserted into the housing. The second contact is adapted to make contact with the second battery terminal exposed through the second terminal opening in the barrel of the battery module. The second contact is designed to make the transition from engagement with the second battery terminal to the external surface of barrel without catching.

The housing defines a battery module opening sized to accommodate the battery module. The inside diameter of the battery module opening is complimentary with the outside diameter of the sealing gasket such that an interference fit is created when the battery module is inserted into the battery module opening. No further compression of the sealing gasket is necessary to create a substantially hermetic seal.

Extending outwardly from the inside surface of the battery module opening is a stop ring. The stop ring has an inside diameter greater than the outside diameter of the barrel but less than the outside diameter of the cover. The stop ring is keyed to the tabs extending from the barrel. This arrangement restricts the insertion orientation of the battery module to ensure proper function of the battery module switch. Specifically, the battery module can be successfully inserted only when the tabs of the battery module are properly aligned with the slots of the stop ring.

Once properly inserted, the battery module is rotated into a secured position. The cover includes a raised handle member that is shaped to be grasped by human fingers and allow rotational forces to be applied to the battery module. In addition, a slot is provided to receive a tool, such as a flat-bladed screwdriver or a coin to provide assistance in applying a rotational force.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A battery module cooperating with an electronic animal control device for activating and deactivating the electronic animal control device, or battery module switch, is shown and described at 100 in the figures. The battery module switch is a user-replaceable power source providing a rotary switching function while maintaining a hermetic seal.

Figure 1:
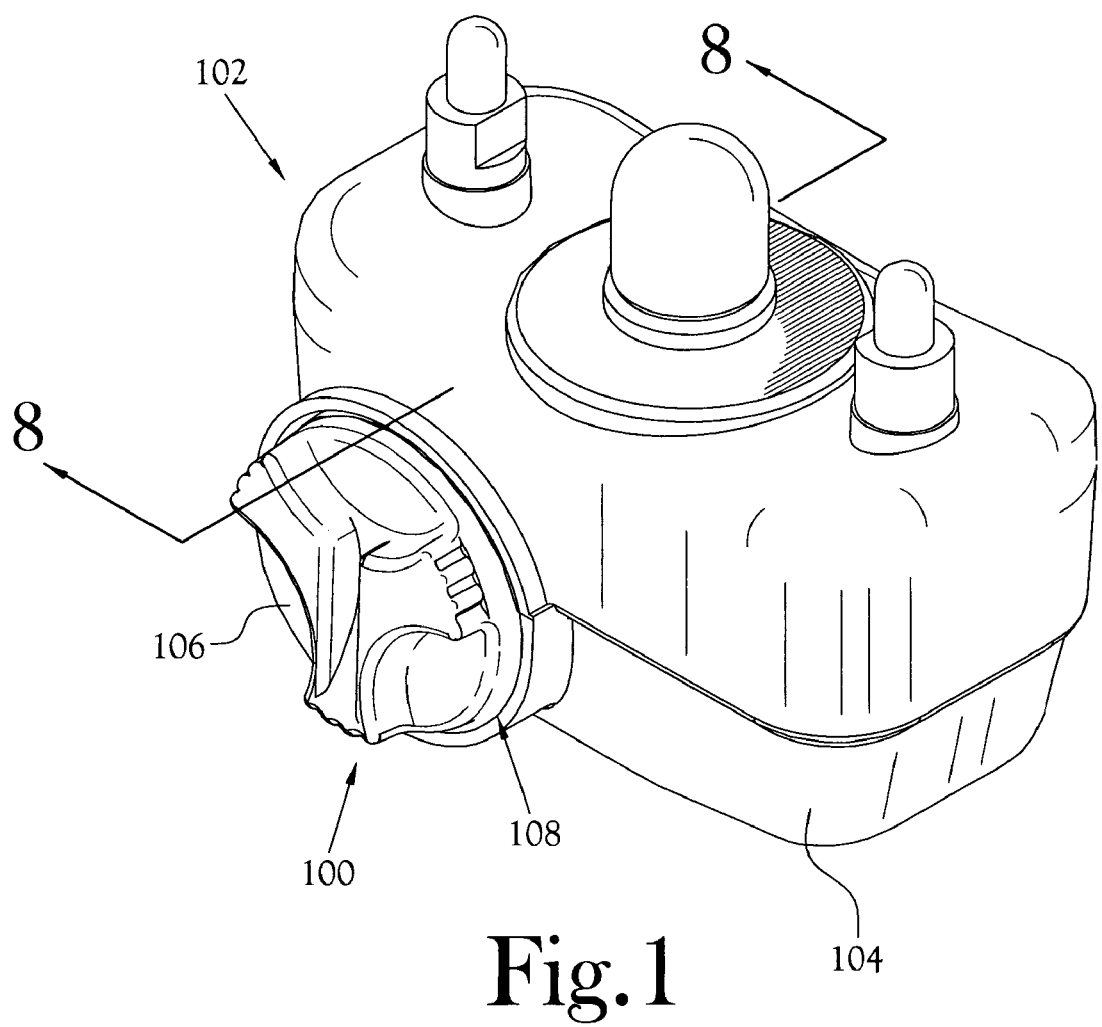
FIG. 1 is a perspective view of an electronic animal control device incorporating one embodiment of the battery module switch of the present invention.

FIG. 1 depicts an electronic animal control device 102 incorporating one embodiment of the battery module switch 100 of the present invention. The electronic animal control device 102 is a representative housing 104 containing the electronics. The housing 104 is attached to a collar (not shown), which is worn by an animal. A battery module 106 is shown inserted into and secured within a battery module opening 108 defined by the housing 104. Because of the integration of a switch and the battery module, no other breach of the housing 104 is necessary to add user accessible controls.

Figure 2:
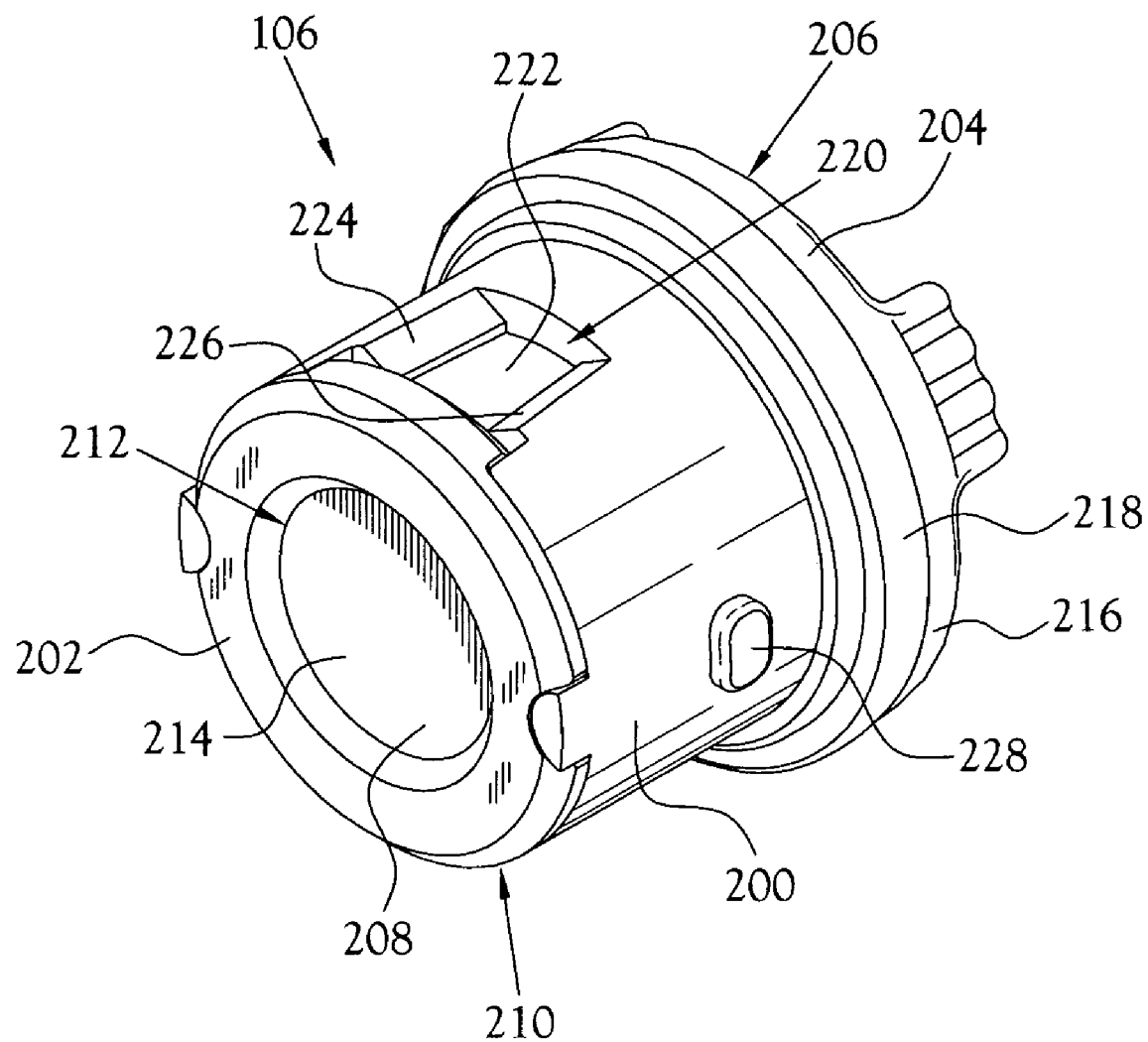
FIG. 2 is a perspective view of one embodiment of a battery module for use with a battery module switch.

FIG. 2 is a perspective view of one embodiment of a battery module 106 for use with the battery module switch 100. The battery module 106 includes a barrel 200, a retainer ring 202, and a cover 204. The barrel 202 is tubular member that is closed on one end 206 and sized to receive and encapsulate a battery 208 within the interior. The barrel 200 is fabricated from a material that is not electrically conductive. The barrel 200 is closed on the opposing end 210 by the retainer ring 202, which secures the battery 208 within the battery module 106. The retainer ring 202 defines a first terminal opening 212 allowing access to a first terminal 214 of the battery 208. The connection of the barrel 200 and the retainer ring 202 is illustrated as a permanent interface accomplished using a chemical, adhesive, and/or thermal bond. In other embodiments, the battery 208 is user-replaceable with the retainer ring secured to the barrel through a temporary connection such as an interlocking threaded arrangement allowing the retainer ring to screw onto the barrel.

The closed-end 206 of the barrel 200 includes the cover 204. In the illustrated embodiment, the cover 204 is integrally formed with the closed-end 206 of the barrel 200. The cover 204 has a radial lip 216 extending beyond the circumference of the barrel, i.e., the cover 204 has an outside diameter greater than the outside diameter of the barrel 200. Proximate to the radial lip 216, the barrel 200 includes a shoulder. A sealing gasket 218 is disposed around the outside edge of the shoulder and against the bottom surface of the radial lip 216.

In one embodiment, the sealing gasket is a removable gasket, such as an o-ring. In the illustrated embodiment, the sealing gasket 218 is a thermal plastic elastomer (TPE) permanently attached to the barrel 200 and cover 204 by a chemical and thermal bond.

Features along the body of the barrel 200 are also visible in FIG. 2. The barrel 200 defines a second terminal opening 220 allowing access to a second terminal 222 of the battery 208. The sides 224, 226 of the barrel 200 around the second terminal opening 220 are sloped to provide a transition between the recessed surface of the battery 208 and the outer surface of the barrel 200. Additionally, at least one tab 228 extends outwardly from the barrel. The tabs 228 provide a key for guiding the insertion of the battery module 106 into the housing 104 and for securing the battery module 106 within the housing 104.

Figure 3:
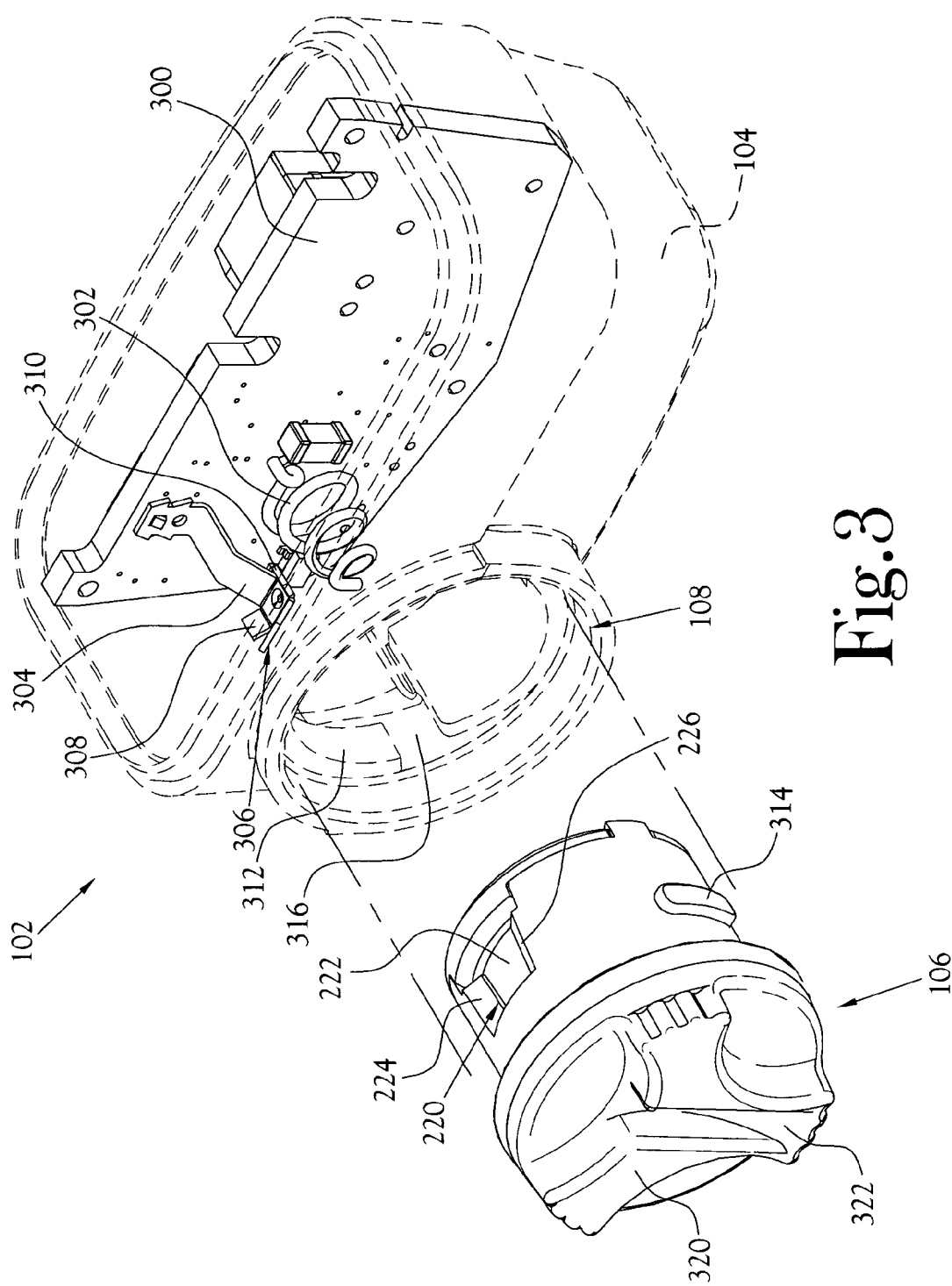
FIG. 3 is a perspective view of an electronic animal control device with the battery module exploded from the housing, which is shown in phantom.

FIG. 3 is a perspective view of an electronic animal control device with the battery module 106 exploded from the housing 104, which is shown in phantom for clarity of illustration. Internal to the housing 104 is an exemplary circuit board 300 carrying the electronics associated with the particular type of electronic animal control device 102. Together the battery module 106, the circuit board 300 and the housing 106 contain components that cooperate to complete the battery module switch 100. Looking first to the electrical contacts, the circuit board 300 includes two electrical contacts adapted to make contact with the exposed terminals 214, 222 of the battery 208 when the battery module 106 is inserted into the housing 104. In the illustrated embodiment, the first contact 302 is an electrically-conductive, tapered, helical coil spring that engages the first battery terminal 214 exposed at the bottom of the battery module 106. The first contact 302 and the first battery terminal 214 remain in physical and electrical communication while the battery 208 is inserted into the housing 104.

The second contact 304 is adapted to make contact with the second battery terminal 222 exposed through the second terminal opening 220 in the barrel 200 of the battery module 106. In the illustrated embodiment, the second contact 304 is an electrically-conductive leaf spring. The distal end 306 of the leaf spring includes two outwardly extending members 308, 310, or wings, which are sloped in a complimentary fashion to the sides 224, 226 of the barrel 200 around the second terminal opening 220. The wings 308, 310 allow the second contact 304 make the transition from engagement with the second battery terminal 222 to the external surface of barrel 200 and back without catching.

In other embodiments, other types of contact members are used, including other types of springs. While the illustrated embodiment, describes the first contact as remaining in electrical contact with the first terminal when the battery module is inserted into the housing, neither contact need have a permanent electrical contact with any terminal of the battery. In another embodiment, the terminal opening of the retainer ring is modified to provide the temporary electrical connection to the first terminal of the battery and the terminal opening in the barrel is extended to remain in permanent electrical communication with the second battery terminal regardless of the rotation of the battery module.

Turning now to the housing 104 and the battery module 106, the mechanical interconnection features associated with the battery module switch 100 are visible. The housing 104 defines the battery module opening 108, which is sized to accommodate the battery module 106. The inside diameter of the battery module opening 108 is complimentary with the outside diameter of the sealing gasket 218 such that an interference fit is created when the battery module 106 is inserted into the battery module opening 108. No further compression of the sealing gasket 218 is necessary to create a substantially hermetic seal.

Extending outwardly from the inside surface of the battery module opening 108 is a stop ring 312. The stop ring 312 has an inside diameter greater than the outside diameter of the barrel 200 but less than the outside diameter of the cover 204. In the illustrated embodiment, the stop ring 312 has an inside diameter smaller than the outside diameter of the sealing gasket 218. When the battery module 106 is inserted into the battery module opening 108, the sealing gasket 218 engages the stop ring 312 and creates a second interference fit. The stop ring 312 is keyed to the tabs 228, 314 extending from the barrel 200. In this view, a second tab 314 is shown. The second tab 314 has a greater width than the first tab 228 shown in FIG. 2. The slots 316 defined by the stop ring 312 are sized to correspond with the tabs 228, 314 extending from the barrel 200. This arrangement restricts the insertion orientation of the battery module 106 to ensure proper function of the battery module switch 100. Specifically, the battery module 106 can be successfully inserted only when the tabs 228, 314 of the battery module 106 are properly aligned with the slots 316 of the stop ring 312.

Once properly inserted, the battery module 106 is rotated into a secured position. In FIG. 3, the top surface of the battery module cover 204 is visible. The cover 204 includes a raised handle member 320 that is shaped to be grasped by human fingers and allow rotational forces to be applied to the battery module 106. In addition, a slot 322 is provided to receive a tool, such as a flat-bladed screwdriver or a coin to provide assistance in applying a rotational force.

Figure 4:
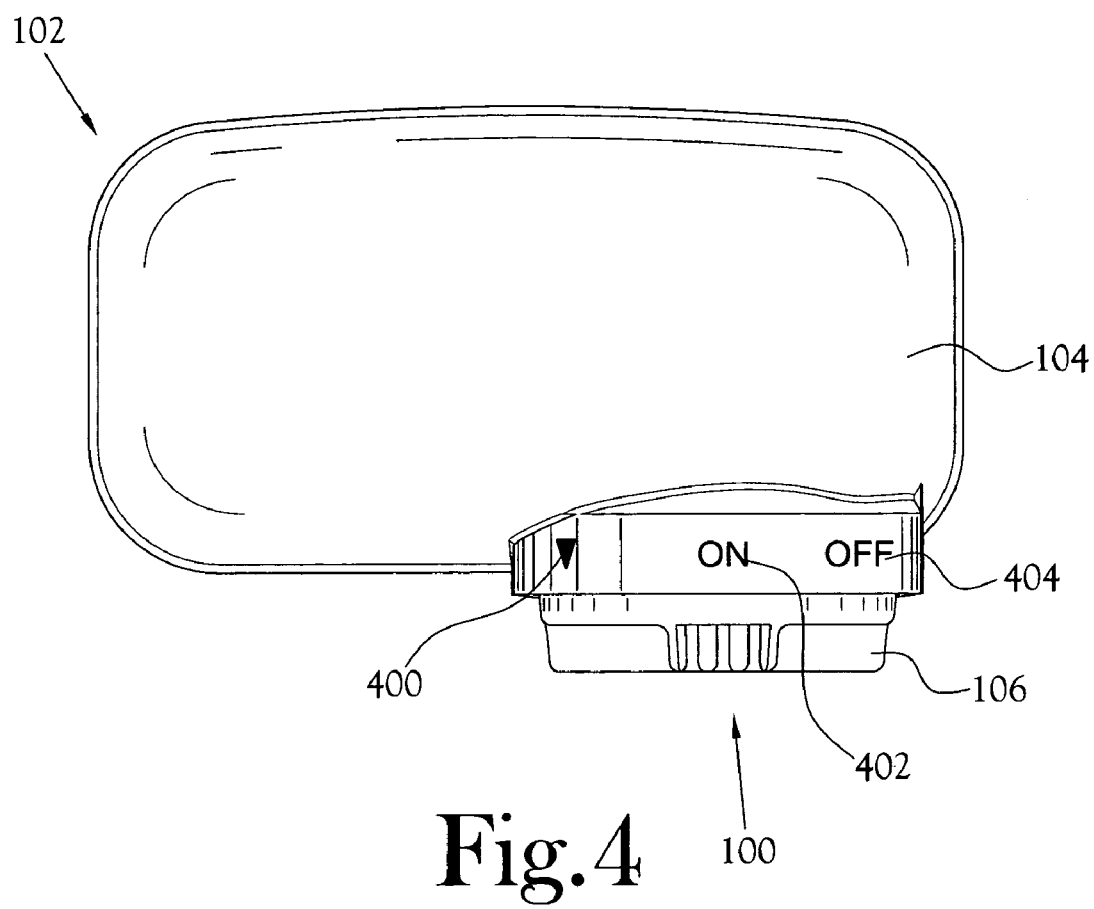
FIG. 4 is a front elevation view of the electronic animal control device illustrating the indicia associated with the switch positions of the battery module switch.

FIG. 4 is a front elevation view of the electronic animal control device 102 illustrating the indicia associated with the switch positions of the battery module switch 100. In the illustrated embodiment, three indicia are shown. The first indicium 400, represented by a triangular shape, corresponds to an insertion position where the tabs of the battery module are properly aligned with the keyed slots of the stop ring and at least one of the battery terminals is not in electrical communication with the corresponding contact. The second indicium 402, represented by the word "ON," corresponds to a rotated position where the battery module and the contacts are in full electrical communication so as to create a complete electrical circuit, i.e., the second contact and the second terminal are in electrical communication. The third indicium 404, represented by the word "OFF," corresponds to a rotated position where at least one of the battery terminals is not in electrical communication with the corresponding contact so as to prevent the completion of an electrical circuit. In the illustrated embodiment, the handle member 320 also serves a pointer for indicating the rotation position of the battery module. In other embodiments, more than three meaningful positions are provided.

Figure 5:
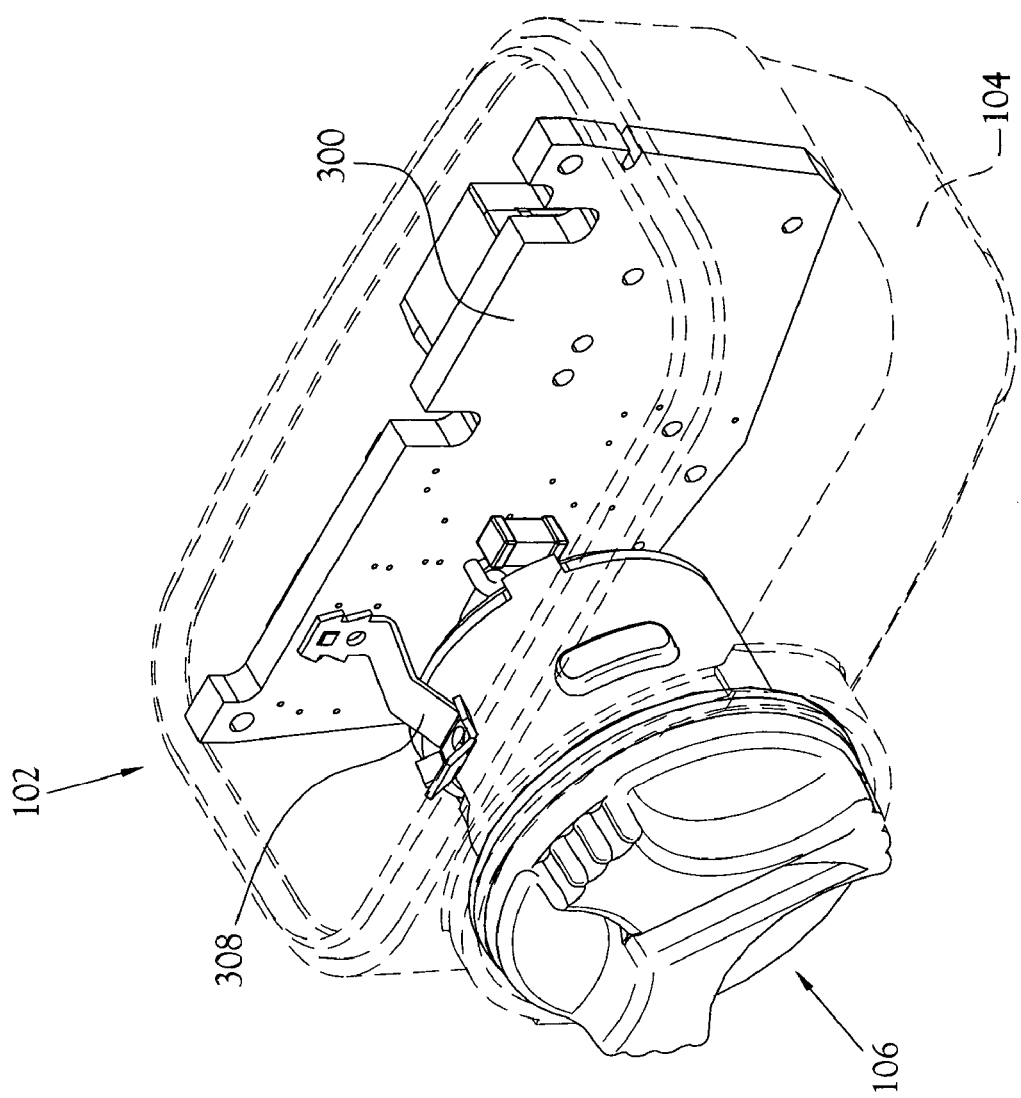
FIG. 5 is a perspective view of an electronic animal control device with the battery module engaging the housing, which is shown in phantom, in the initial insertion position.

FIG. 5 is a perspective view of an electronic animal control device 102 with the battery module 106 engaging the housing 104, which is shown in phantom, in the initial insertion position. As previously described, the alignment of the tabs with the slots in the stop ring is shown. Also illustrated is the interruption of electrical communication between the second contact and the second terminal in this position. In this position, the battery module 106 is not secured and can be inserted or removed from the battery module opening 108.

Figure 6:
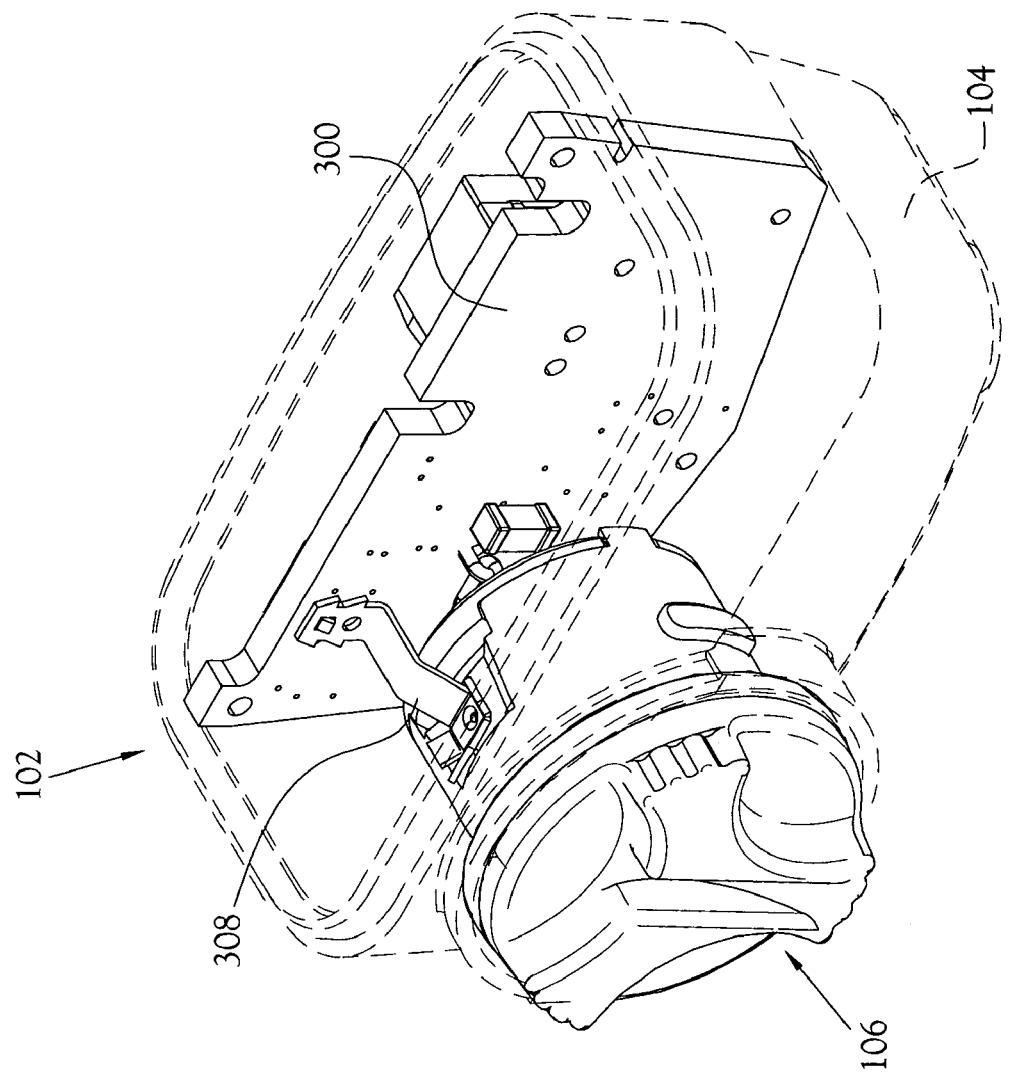
FIG. 6 is a perspective view of an electronic animal control device with the battery module engaging the housing, which is shown in phantom, in the "on" position.

FIG. 6 is a perspective view of an electronic animal control device 102 with the battery module 106 engaging the housing 104, which is shown in phantom, in the "on" position. When rotated, the second contact and the second battery terminal are brought into electrical communication. In this position, the battery module 106 is secured in the battery module opening 108 by the interaction of the tabs and the stop ring.

Figure 7:
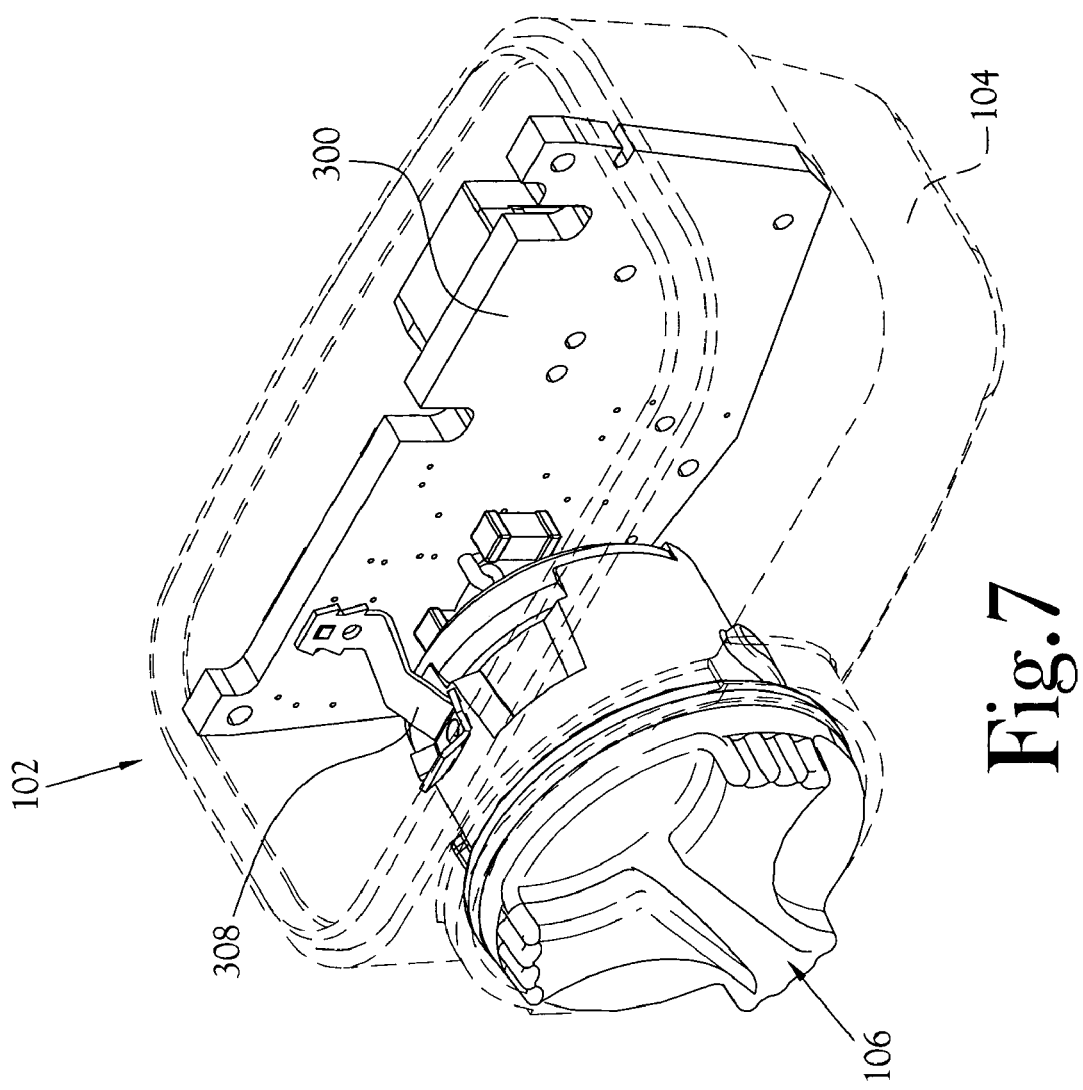
FIG. 7 is a perspective view of an electronic animal control device with the battery module engaging the housing, which is shown in phantom, in the "off" position.

FIG. 7 is a perspective view of an electronic animal control device 102 with the battery module 106 engaging the housing 104, which is shown in phantom, in the "off" position. When rotated, electrical communication between the second contact and the second battery terminal are broken. In this position, the battery module 106 is secured in the battery module opening 108 by the interaction of the tabs and the stop ring.

Figure 8:
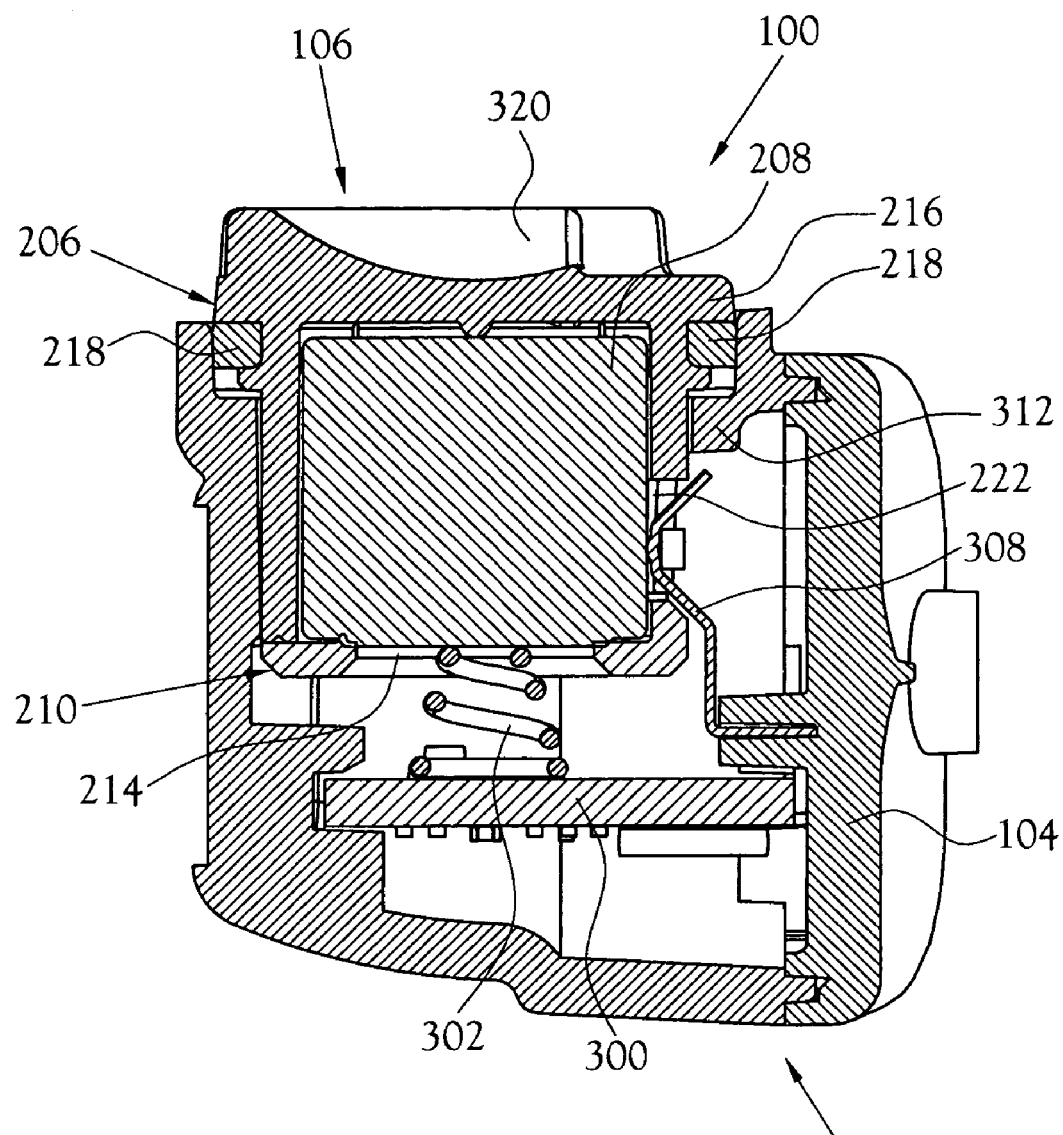
FIG. 8 is a sectional view of the battery module engaging the housing taken along section 8-8 of FIG. 1.

FIG. 8 is a sectional view of the battery module engaging the housing taken along section 8-8 of FIG. 1. In this view, the battery module is rotated into the "on" position.

Figure 9:
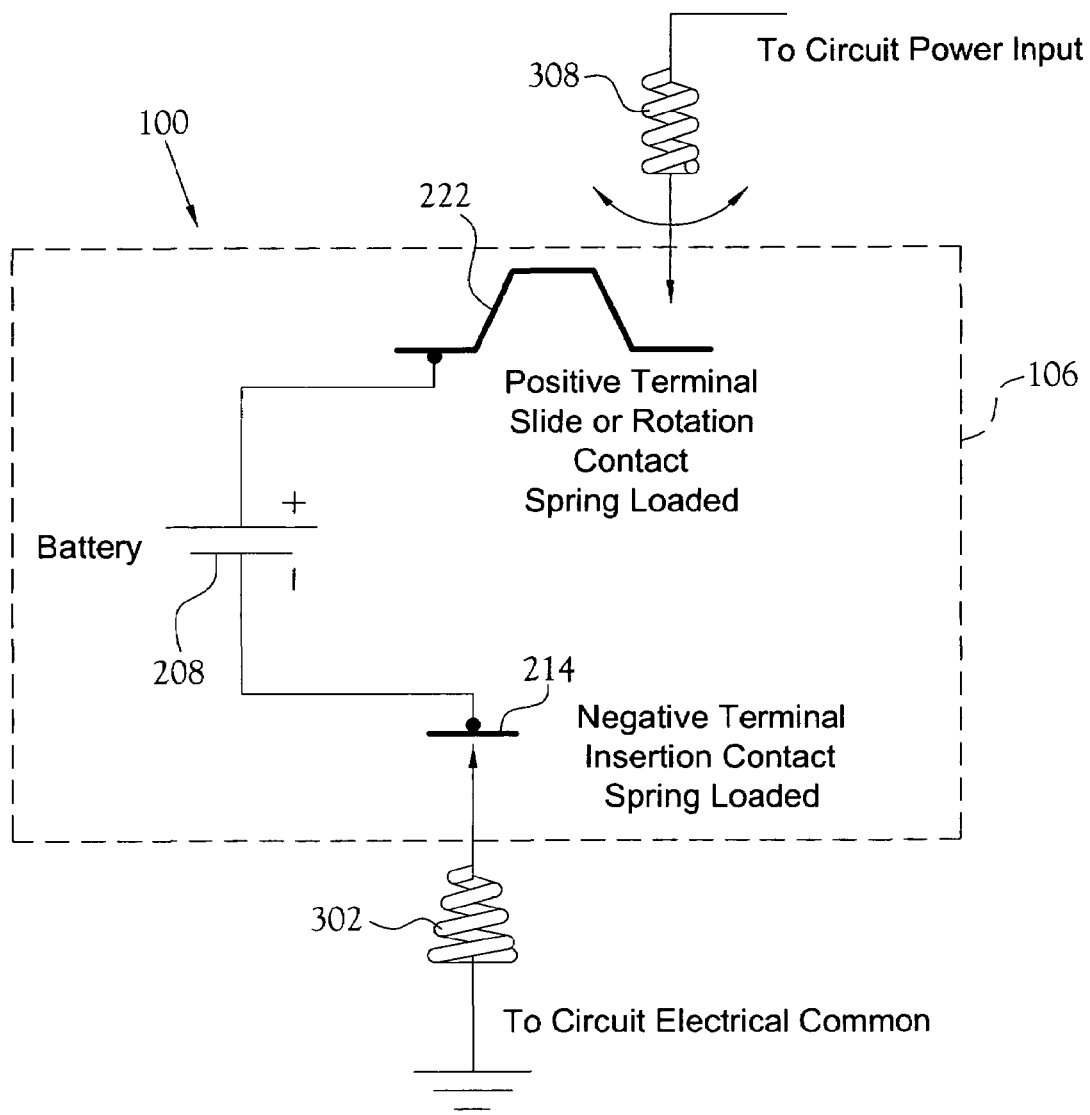
FIG. 9 is a simplified schematic representation of the battery module switch.

FIG. 9 is a simplified schematic representation of the battery module switch 100. The battery module 106 encompasses the battery 208, which includes the negative terminal 214 and the positive terminal 222. The negative terminal 214 is placed in electrical communication with the common ground of the circuit through the first contact 214. The positive terminal 222 is placed in electrical communication with the power input of the circuit through the second contact 308 via rotary motion of the battery module 106 into a first position. Further, rotating the battery module 106 to a second position interrupts electrical communication between the positive terminal 222 of the battery 208 and the power input of the circuit.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A battery module switch comprising:
   a housing defining a battery module opening;
   a circuit disposed within said housing, said circuit comprising a first contact and
   a second contact adapted to establish an electrical connection with a power source;
   a battery module adapted to fit within said battery module opening, said battery module carrying a battery having a first terminal and a second terminal, said defining a terminal opening providing access to said first terminal of said battery module battery, said battery module having a first position wherein said terminal opening is aligned with said first contact thereby placing said first terminal of said battery and said first contact in electrical communication and a second position wherein said terminal opening is not aligned with said first contact thereby interrupting electrical communication between said first terminal of said battery and said first contact, said second terminal and said second contact being in electrical communication when said battery module is in said first position; and
   a gasket forming a seal between said battery module and said housing when said battery module is inserted into said battery module opening.

2. The battery module switch of claim 1 wherein said gasket is fabricated from a thermoplastic elastomer bonded to said battery module.

3. The battery module switch of claim 1 wherein said battery module is electrically non-conductive.

4. The battery module switch of claim 1 wherein said gasket engages said battery module opening in an interference fit when said battery module is inserted into said battery module opening.

5. The battery module switch of claim 1 wherein said battery module further comprises a second terminal opening, said second terminal being electrically accessible through said second terminal opening.

6. A battery module switch assembly comprising:
a housing defining a battery module opening;
a circuit carried by said housing, said circuit comprising a first contact and a second contact adapted to cooperatively establish an electrical connection to a power source; and
a battery module adapted to be received in said battery module opening, said battery module carrying a battery having a first terminal and a second terminal, said battery module being moveable between a first position in which said first terminal engages said first contact and said second terminal engages said second contact to electrically connect said battery to said circuit and a second position in which said first terminal disengages from said first contact to electrically disconnect said battery from said circuit, said battery module forming a seal with said housing when said battery module is received by said battery module opening.

7. The battery module of claim 6 wherein said housing further comprises a slot and said battery module further comprises a tab extending from an outer surface of said battery module, said tab keyed to said slot.

8. The battery module switch assembly of claim 6 wherein at least one of said battery module and said housing further comprises a gasket, said gasket adapted to engage said housing and form a seal between said battery module and said housing when said battery module is received within said battery module opening.

9. The battery module switch of claim 8 wherein said gasket is fabricated from a thermoplastic elastomer bonded to said battery module.

10. The battery module switch of claim 8 wherein said gasket engages said battery module and said housing in an interference fit when said battery module is inserted into said battery module opening.

11. The battery module switch assembly of claim 6 wherein said battery module housing defines a first terminal opening providing access to said first terminal of said battery and a second terminal opening providing access to said second terminal of said battery.

12. The battery module switch of claim 6 wherein said second terminal is placed in electrical communication with said second contact when said battery module is received by said opening in said housing.

13. The battery module switch of claim 6 wherein said housing is electrically non-conductive.

14. A battery module for use with an electronic device, the electronic device having a housing carrying circuitry requiring power, the housing defining an opening adapted to receive said battery module, the circuitry adapted to receive power from said battery module, said battery module comprising:
a battery adapted to provide power to the circuitry, said battery having a first terminal and a second terminal;
a casing adapted to be received by the opening in the housing of the electronic device, said casing carrying said battery, said casing having a first access point adapted to allow electrical communication with said first terminal and a second access point adapted to allow electrical communication with said second terminal, said casing being moveable within said opening between a first position and a second position when received by the opening, said first access point and said second access point adapted to cooperatively complete a circuit between said battery and the circuitry and provide power to said circuit when said casing is moved to said first position, said first access point adapted to interrupt the circuit between said battery and the circuitry and remove power from said circuit when said casing is moved to said second position.

15. The battery module of claim 14 wherein said casing comprises a barrel, a retainer ring, and a cover.

16. The battery module of claim 14 wherein said first access point comprises a first terminal opening defined by said casing and said second access point comprises a first terminal opening defined by said casing.

17. The battery module switch assembly of claim 14 wherein the circuitry includes a first contact and a second contact, said first access point being adapted to be placed in physical and electrical communication with said first contact and said second access point being adapted to be placed in physical and electrical communication with said second contact when said battery module is moved to said second position, said first access point adapted to be removed from physical and electrical communication with said first contact when said battery module moved to a second position.

18. The battery module of claim 14 wherein said first access point is aligned with the first contact and said second access point is aligned with the second contact when said casing is moved to said first position and said first access point is not aligned with the first contact when said casing is moved to said second position.

19. The battery module of claim 14 wherein said first access point comprises one of an opening defined by said casing allowing electrical communication with said first terminal and a conductor in electrical communication with said first terminal and said second access point comprises one of an opening defined by said casing permitting electrical communication with said second terminal and a conductor in electrical communication with said second terminal.

20. The battery module of claim 14 wherein said casing is adapted cooperate with the housing to seal the opening when said casing is received by the opening.

21. The battery module of claim 14 wherein said battery module is adapted to be secured within the opening when said casing is in said first position and said second position.

* * * * *